United States Patent [19]
Kumar et al.

[11] Patent Number: 5,944,777
[45] Date of Patent: Aug. 31, 1999

[54] METHOD AND APPARATUS FOR GENERATING CARRIES IN AN ADDER CIRCUIT

[75] Inventors: Sanjay Kumar, Phoenix, Ariz.; Sudarshan Kumar, Fremont, Calif.

[73] Assignee: Intel Corporation, Santa Clara, Calif.

[21] Appl. No.: 08/851,527

[22] Filed: May 5, 1997

[51] Int. Cl.$^6$ ..................................................... G06F 7/50
[52] U.S. Cl. ........................................................... 708/713
[58] Field of Search ..................... 364/787.04, 787.03, 364/787.02, 787.01; 708/713, 712, 711, 710

[56] References Cited

U.S. PATENT DOCUMENTS

| | | | |
|---|---|---|---|
| 4,163,211 | 7/1979 | Miura | 364/787.04 |
| 4,504,924 | 3/1985 | Cook et al. | 364/787.01 |
| 4,660,165 | 4/1987 | Masumoto | 364/787.03 |
| 4,764,886 | 8/1988 | Yano | 364/787.03 |
| 5,095,458 | 3/1992 | Lynch et al. | 364/787.04 |
| 5,122,982 | 6/1992 | Cohn | 364/787.01 |
| 5,479,356 | 12/1995 | Shackleford et al. | 364/787.04 |

*Primary Examiner*—David H. Malzahn
*Attorney, Agent, or Firm*—David J. Kaplan

[57] ABSTRACT

An adder circuit to generate carry-outs and a method implemented by the adder circuit. First and second groups of consecutive group generate terms are calculated. The first group of group generate terms are combined to calculate a first result at a first logic level, and the second group of group generate terms are combined to calculate a second result at the same logic level. The first and second results are then combined to calculate a carry-out at a second logic level.

3 Claims, 3 Drawing Sheets

METHOD AND APPARATUS FOR GENERATING CARRIES IN AN ADDER CIRCUIT

FIELD OF THE INVENTION

The present invention relates to computer systems and more particularly to a carry generator circuit for an adder in an integrated circuit device, and a method for generating carries.

DESCRIPTION OF RELATED ART

One of the basic functions in the operation of virtually all computer systems is adding two numbers together. Addition is typically performed by an adder circuit in an integrated circuit device known as a processor contained within a computer system. A processor is generally considered to be the "brains" of the computer system because within the processor various mathematical and logical functions are executed. Having an addition function provided by an adder circuit in the processor is essential for the performance of the computer system because addition is not only used to provide numerical sums for the computer user but also used to implement numerous logic functions necessary to run software on the computer. Hence, improving the performance of an adder circuit in a processor or other integrated circuit device will result in performance improvement of the overall computer system. In addition, reducing the size and complexity of the adder circuit, while still providing the necessary functionality, results in reduced manufacturing cost and improved circuit reliability, which translates into reduced cost and improved reliability of computer systems to the end user.

When two bits (binary digits) of two binary numbers are added together, the result is a sum of the two bits plus a carry to the next most significant column of bits. For example, the binary addition of the binary numbers "11" (a decimal "3") and "101" (a decimal "5") is performed by first adding the least most significant bits of each number, "1" and "1", resulting in "10", of which the "0" is the sum, and the "1" is the carry-out. The carry-out is carried into the next column of bits, "1" and "0", where the carry-out is considered the carry-in. The carry-in value of "1" is added to the "1" and the "0", resulting in a sum of "0" and a carry-out of "1." The carry-out is carried into the next column of bits, "1", as the carry-in. The carry-in value of "1" is added to the "1", resulting in a sum of "0" and a carry-out of "1", which is placed at the front of the total sum. So the final total is "1000" (a decimal "8").

The sum of two binary numbers, A and B, along with a carry-in, $C_{in}$, is generated at the circuit level by an exclusive OR (XOR) function applied to corresponding bits, $A_n$ XOR $B_n$ XOR $C_{in(n)}$. Generating the carry-out is more complicated, however, because the value of the carry-out is dependent upon the carry-in, which may not be known until the sums of previous corresponding bits are calculated. For example, the carry-out of "1" and "0" (A and B, respectively) is "0" if the carry-in is "0", and the carry-out is "1" if the carry-in is "1". The carry-out, $C_{out}$, is based on the value of the first bit, $A_n$, the second bit, $B_n$, and $C_{in}$. Two intermediate terms are used to determine the carry-out value, "generate", denoted "$g_n$", and "propagate", denoted "$p_n$". Generate, $g_n$, is equal to the AND function of $A_n$ with $B_n$, $A_n \cdot B_n$. Propagate, $p_n$, is equal to the OR function of $A_n$ with $B_n$, $A_n + B_n$. $C_{out}$ for $A_n$, $B_n$, and $C_{in}$ can then be determined according to the equation $$C_{out} = g_n + P_n \cdot C_{in}$$

where "+" denotes the logical function "OR", and "·" denotes the logical function "AND".

An adder circuit for larger binary numbers includes smaller blocks of adder circuits that add together portions of larger binary numbers in parallel. A 32 bit adder that adds two 32 bit numbers together may be broken into, for example, 8 four bit adder blocks, 4 eight bit adder blocks, or 5 six bit adder blocks plus a two bit adder block. The carry-outs from each of these adder blocks is calculated as a function of "block-wise" generate and propagate terms called "group generate", G, and "group propagate", P. G and P are calculated from the bit-wise generate, g, and bit-wise propagate, p, values according to the equations $$Gm = g_n + p_n \cdot g_{n-1} + p_n \cdot p_{n-1} g_{n-2} + \ldots + p_n \cdot p_{n-1} \cdots p_1 g_0$$

$$Pm = p_n \cdot p_{n-1} p_{n-2} \cdots P_0$$

where Gm and Pm are the group generate and group propagate values, respectively, of the mth adder block of n+1 bits of the overall adder. The carry-out value, Cm, for this block can then be calculated as $$Cm = Gm + Pm \cdot C(m-1)$$

For block 0, Cm, or C0, is simply equal to G0 because there is no carry-in term, C(m-1), to the first block (i.e. C(m-1)=0). For block 1, $$C1 = G1 + P1 \cdot C0$$
$$= G1 + P1 \cdot G0$$

which can be easily implemented at the circuit level using one AND gate to generate the P1G0 term, and one OR gate to OR the result of the AND gate function with G1.

For block 2, $$C2 = G2 + P2 \cdot C1$$
$$= G2 + P2 \cdot (G1 + P1 \cdot G0)$$
$$= G2 + P2 \cdot G1 + P2 \cdot P1 \cdot G0$$

which can be implemented at the circuit level using one three input AND gate, one two input AND gate, and one three input OR gate.

For block 3, $$C3 = G3 + P3 \cdot C2$$
$$= G3 + P3 \cdot (G2 + P2 \cdot G1 + P2 \cdot P1 \cdot G0)$$
$$= G3 + P3 \cdot G2 + P3 \cdot P2 \cdot G1 + P3 \cdot P2 \cdot P1 \cdot G0$$

which can be implemented at the circuit level, assuming a maximum logic gate fan-in of three inputs (due to, for example, size, speed, or power constraints), using two three input AND gates, one two input AND gate, and one three input OR gate at a first logic stage or "level", and one two input AND gates and one two input OR gate at a second level, wherein the second level logic implements logical functions on one or more outputs from the first level.

It can be seen that as m increases, generating the carry-out term Cm can involve an increasingly large number of logic gates, levels, and associated interconnects. Increasing the number of levels slows the adder circuit, and as the number of logic gates and interconnects increases, the size and, consequently, the cost of the adder circuit also increases. What is desired is a high speed adder circuit of reduced size.

SUMMARY OF THE INVENTION

An adder circuit to generate carry-outs and a method implemented by the adder circuit are described. First and second groups of consecutive group generate terms are calculated. The first group of group generate terms are combined to calculate a first result at a first logic level, and the second group of group generate terms are combined to calculate a second result at the same logic level. The first and second results are then combined to calculate a carry-out at a second logic level.

Other features and advantages of the present invention will be apparent from the accompanying drawings and the detailed description that follows.

BRIEF DESCRIPTION OF THE DRAWINGS

The present invention is illustrated by way of example and not limitation in the figures of the accompanying drawings in which like references indicate similar elements and in which.

DETAILED DESCRIPTION

An adder circuit to generate carry-outs and a method implemented by the adder circuit is described. The adder circuit includes multiple levels of logic gates wherein each level represents a single gate delay. A higher level (closer to the carry-outs, further from the source of the group generates and group propagates) includes a logic gate, corresponding to a first carry-out, that generates the final value of a first carry-out. For example, the output of a logic gate at a third level is carry-out C4. This is to say that C4 is "finally" calculated at Level 3.

A lower level (closer to the source of the group generates and group propagates, further from the carry-outs) includes a logic gate, corresponding to a second carry-out, that generates the final value of the second carry-out. The second carry-out, however, is subsequent to the first. For example, the output of a logic gate at a second level is carry-out C5 (i.e. C5 is finally calculated at Level 2). Subsequent carries, beyond C5, such as C6, are then finally calculated at higher levels, such as Level 3 or more.

A more detailed description of the present invention, including various configurations and implementations in accordance with alternate embodiments of the present invention, is provided below.

Figure 1:
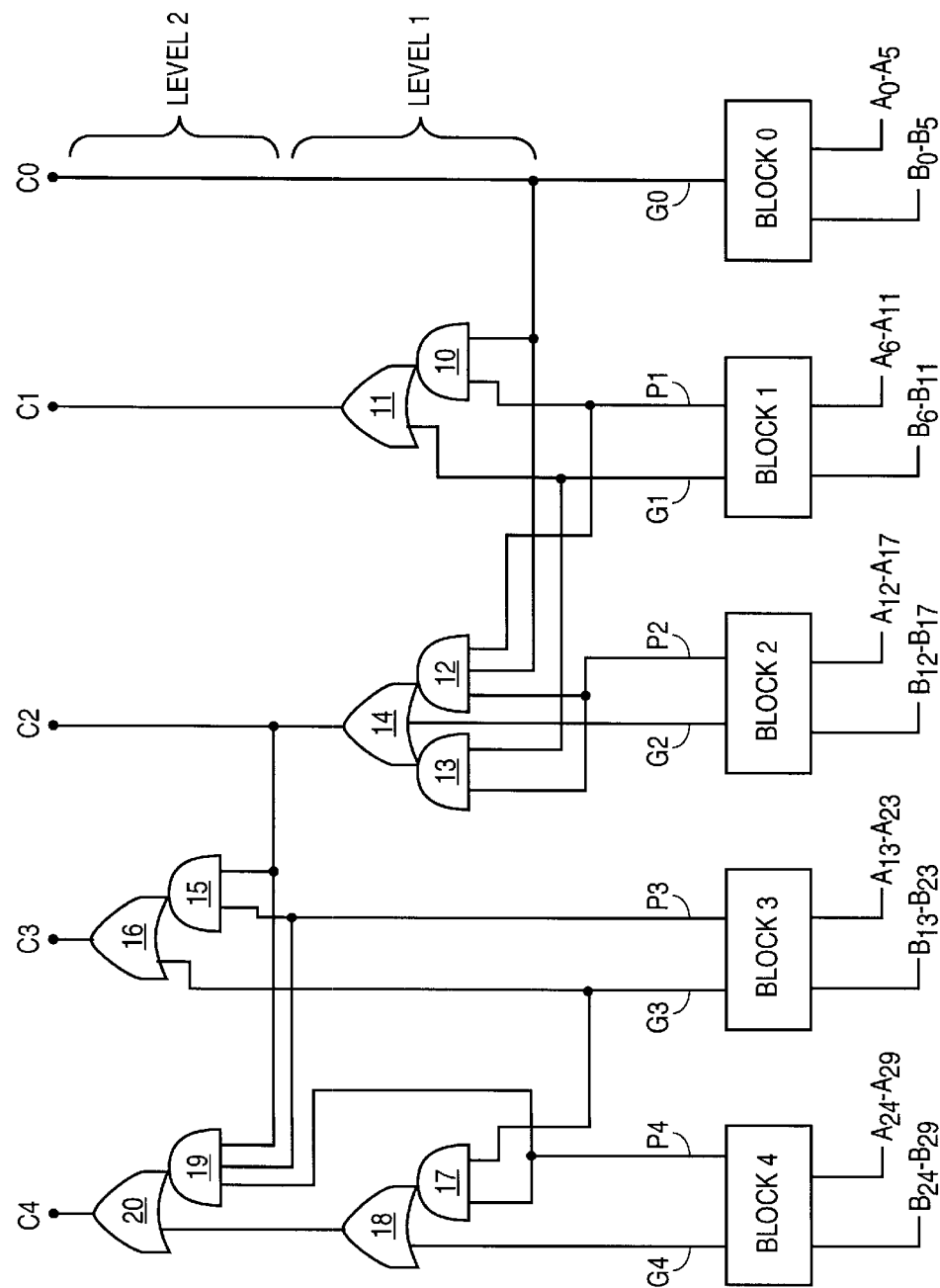
FIG. 1 is a carry-out generator of an adder circuit formed in accordance with an embodiment of the present invention.

FIG. 1 is a carry-out generator of a thirty bit adder circuit formed in accordance with an embodiment of the present invention. Each of Blocks 0–4 are six bit adders that take corresponding six bit portions of thirty bit binary numbers A and B, and produce a sum (not shown), a group generate term, G, and a group propagate term P for use in calculating the carry-out values, C, of each block. Block 0 accepts bits $A_0$ through $A_5$ of binary number A, bits $B_0$ through $B_5$ of binary number B, and produces group generate value G0 using circuitry that implements the equations provided above. Note that there is no need to calculate group propagate value P0 (not shown) because there is never any carry-in value to propagate through to carry-out at the first block, Block 0. $C_0$ is then calculated according to the equations provided above. Because $C_0 = G_0$, the $C_0$ carry-out signal line is simply coupled to G0 of Block 0 as shown.

Block 1 of FIG. 1 accepts bits $A_6$ through $A_{11}$ of binary number A, bits $B_6$ through $B_{11}$ of binary number B, and produces group generate value G1 and group propagate value P1 using circuitry that implements the equations provided above. C1 is then calculated according to the equations provided above. More specifically, $$C1 = G1 + P1 \cdot G_0$$

wherein AND gate 10 calculates the term $P1 \cdot G_0$, and OR gate 11 calculates the final value.

Block 2 of FIG. 1 accepts bits $A_{12}$ through $A_{17}$ of binary number A, bits $B_{12}$ through $B_{17}$ of binary number B, and produces group generate value G2 and group propagate value P2. C2 is then calculated according to the equation $$C2 = G2 + P2 \cdot G1 + P2 \cdot P1 \cdot G0$$

wherein AND gate 12 calculates the term $P2 \cdot P1 \cdot G0$, AND gate 13 calculates the term $P2 \cdot G1$, and OR gate 14 calculates the final value.

Block 3 of FIG. 1 accepts bits $A_{18}$ through $A_{23}$ of binary number A, bits $B_{18}$ through $B_{23}$ of binary number B, and produces group generate value G3 and group propagate value P3. C3 is then calculated according to the equation $$C3 = G3 + P3 \cdot C2$$

wherein AND gate 15 calculates the term $P3 \cdot C2$, and OR gate 16 calculates the final value. Note that because C3 is calculated using a value, C2, previously calculated via OR gate 14, the determination of C3 must wait until the output from OR gate 14, C2, is calculated, delaying the calculation of C3. OR gate 16 is said to exist at a higher "level" with respect to OR gate 14. As shown in FIG. 1, OR gate 14, along with OR gate 11 and AND gates 10, 12, and 13, resides at Level 1 of the carry generator circuit. OR gate 16, along with AND gate 15, reside at Level 2 of the carry generator circuit. A level is higher if it is closer to the final carry-outs (i.e. further from the adder blocks as measured by the propagation of the group propagate and group generate terms to the final carry-out terms).

Block 4 of FIG. 1 accepts bits $A_{24}$ through $A_{29}$ of binary number A, bits $B_{24}$ through $B_{29}$ of binary number B, and produces group generate value G4 and group propagate value P4. C4 is then calculated according to the equation $$C4 = (G4 + P4 \cdot G3) + P4 \cdot P3 \cdot C2$$

wherein AND gate 17 calculates the term $P4 \cdot G3$, OR gate 18 calculates the term $G4 + P4 \cdot G3$, AND gate 19 calculates the term $P4 \cdot P3 \cdot C2$, and OR gate 20 calculates the final value. Note that because C4 is calculated using values C2 and $G4 + P4 \cdot G3$ which are previously calculated via OR gates 14 and 18, respectively, the determination of C4 must wait until the outputs from OR gates 14 and 18 are calculated, delaying the calculation of C4. OR gate 20, along with AND gate 19, exists at Level 2 while OR gate 18, along with AND gate 17, reside at Level 1 of the carry generator circuit.

For an alternate embodiment of the present invention, the carry-out generator is expanded to accommodate a larger adder. In accordance with one embodiment of the present invention, the adder blocks that produce the group generate and group propagate terms are a different size than six bit adder blocks, such as, for example, 1, 2, 3, 4, 5, or 7 or more bit adder blocks. The size of the adder blocks that provide the group generate and group propagate terms are appropriately selected to reduce the circuit dimensions and cost of the overall adder circuit. For one embodiment, not all of the adder blocks are of equal size.

Extrapolating the circuit of FIG. 1 to higher levels in accordance with an embodiment in which a larger adder circuit is implemented, it can be seen that as the number of levels increases, the delay time between the generation of the first carry-out value and the final carry-out value also increases. The delay time increases because the calculation of subsequent carry-outs at higher levels relies on first calculating terms necessary to generate previous carry-outs at lower levels. Therefore, in accordance with one embodiment of the present invention, the number of levels implemented in a carry generator circuit is reduced by using large fan-in domino gates to improve the speed of the adder circuit. This reduction in levels, however, is balanced against the maximum fan-in of the logic gates (the maximum number of inputs a single logic gate will accept), the number of adder blocks that produce the group generate and group propagate terms, size, power, speed, and other design constraints.

Note that as shown in Figure one, AND_OR and OR_AND logic gates represent a single computational logic level rather than two. This is because these functions can be implemented using circuitry that executes these functions in a single gate delay. For purposes of the discussion herein, however, the AND gates and OR gates are discussed individually for clarity. It is to be appreciated that while AND gate and OR gate logic functions are discussed independently of one another, a circuit designer can combine these functions in a single logic level using AND_OR and OR_AND logic gates.

As used herein, subsequent carry-outs are carry out values corresponding to adder blocks that calculate group generate and group propagate values from more significant bits in the numbers being added. Previous or prior carry-outs are carry out values corresponding to adder blocks that calculate group generate and group art propagate values from less significant bits. For example, carry-outs C3 and C4 are both subsequent to carry-out C2 because $A_{,18}$–$A_{23}$, $A_{24}$–$A_{29}$, $B_{18}$–$B_{23}$, and $B_{24}$–$B_{29}$ are all more significant bits than $A_{12}$–$A_{17}$ and $B_{12}$–$B_{17}$, of adder Block 2 to which C2 corresponds. Similarly, carry-outs C0 and C1 are both previous to carry-out C2 because $A_0$–$A_5$, $A_6$–$A_{11}$, $B_0$–$B_5$, and $B_6$–$B_{11}$ are all less significant bits than $A_{12}$–$A_{17}$ and $B_{12}$–$B_{17}$, of adder Block 2.

Figure 2:
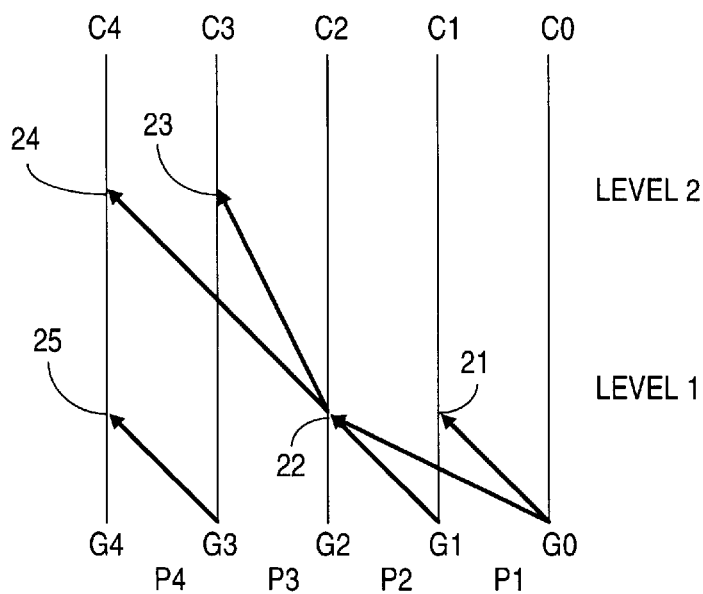
FIG. 2 is the circuit of FIG. 1 in stick diagram form.

FIG. 2 is the circuit of FIG. 1, absent adder Blocks 0–4, in stick diagram form. Stick diagrams are a convenient way of showing carry generation circuitry of an adder circuit. Nodes are points on the vertical lines of a stick diagram where the diagonal arrows terminate. Nodes represent OR functions that OR together any terms calculated below the node on the vertical line with the term or terms fed into the node along the diagonal arrows from the point of origin of the arrow. All arrows originate either at a node or at a group generate term, G. As terms are fed into a node (or OR gate) along a diagonal arrow, the terms are ANDed with any group propagate value, P, the domain of which the diagonal arrow crosses.

For example, as shown in FIG. 2, following the first, right-most, vertical line, carry-out C0 is simply G0. This corresponds to the direct coupling of C0 with the G0 output of Block 0 of FIG. 1. Referring back to FIG. 2, following the second vertical line between G1 and C1, it can be seen that C1 is G1 ORed (at node 21) with the term fed in along the diagonal arrow originating at G0 and terminating at node 21. This term is G0 AND P1 (G0 is ANDed with P1 because G0 crosses the P1 domain between the first and second vertical lines along the arrow). Thus, $C1=G1+P1 \cdot G_0$, wherein the $P1 \cdot G_0$ term corresponds to the output of AND gate 10 of FIG. 1, and the final result, C1, corresponds to the output of OR gate 11.

Referring again to FIG. 2 and following the third vertical line between G2 and C2, it can be seen that C2 is G2 ORed (at node 22) with the term P2·G1 (fed in along the diagonal arrow between node 22 and G1) and with the term P2·P1·G0 (fed in along the diagonal arrow between node 22 and G0). The output of node 22 corresponds to the output of OR gate 14 of FIG. 1. The term P2·G1 fed in along the diagonal arrow between node 22 and G1 corresponds to the output of AND gate 13 fed into OR gate 14 of FIG. 1. The term P2·P1·G0 fed in along the diagonal arrow between node 22 and G0 corresponds to the output of AND gate 12 fed into OR gate 14 of FIG. 1.

Following the fourth vertical line between G3 and C3 of FIG. 2, it can be seen that C3 is G3 ORed (at node 23) with the output at node 22 ANDed with P3. This is to say that $$C3 = G3 + P3 \cdot (G2 + P2 \cdot G1 + P2 \cdot P1 \cdot G0)$$
$$= G3 + P3 \cdot C2$$

wherein the G3 term is fed from G3 at the base of the vertical line and the G2+P2·G1+P2·P1·G0 term (C2) is fed from the output of node 22. Note how this calculation corresponds to the circuit of FIG. 1.

Following the fifth vertical line between G4 and C4 of FIG. 2, if can be seen that C4 is G4 ORed (at node 25) with the term P4·G3, and the output of this node is ORed (at node 24) with the output at node 22 ANDed with P4 AND P3 (P4·P3). This is to say that $$C4 = (G4 + P4 \cdot G3) + P4 \cdot P3 \cdot (G2 + P2 \cdot G1 + P2 \cdot P1 \cdot G0)$$
$$= (G4 + P4 \cdot G3) + P4 \cdot P3 \cdot C2.$$

Note how this calculation corresponds to the circuit of FIG. 1.

The maximum fan-in, the number of levels, and the number of blocks of a carry-out generator of an adder circuit are roughly related to each other according to the following equation $$X^Y \geq Z$$

wherein X is equal to the maximum fan-in, Y is equal to the number of levels, and Z is equal to the number of blocks. Using this equation it can be seen that once the maximum fan-in of the logic gates and the number of adder blocks is determined (according to, for example, size and power constraints), the minimum number of levels necessary to implement the carry generator circuit can be calculated. Once the minimum number of levels is known, the carry-out generator circuit is designed to take advantage of all of the available levels, including levels higher than what is necessary to generate early carry-out values, to reduce the number of circuit elements, interconnects, and complexity of the carry generator circuit. There is no additional delay associated with designing logic gates of the carry-out generator circuit that take advantage of these higher levels because the carry-out results are delayed by the predetermined number of levels regardless of which carry term utilizes which particular level.

Figure 3:
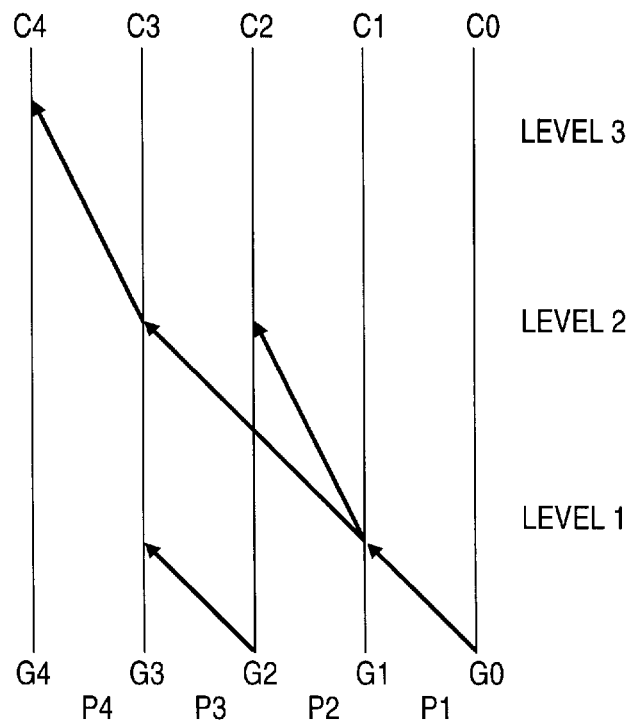
FIG. 3 is a carry-out generator of an adder circuit formed in accordance with one embodiment of the present invention.

For example, FIG. 3 is a portion of a carry-out generator of an adder circuit formed in accordance with one embodiment of the present invention. The circuit of FIG. 3 assumes a maximum fan-in of three, and eleven adder blocks. FIG. 3 shows how the first five (of eleven) carry-out values (C0 to C4), associated with the first five adder blocks of the adder circuit, are calculated. The minimum number of levels is calculated, using the above equation, to be three (i.e. $3^3 \geq 11$).

As shown in FIG. 3, C0 is equal to G0 and is implemented by coupling the G0 output of the first block, block 0, directly to C0. C1 is equal to G1+P1·G0 and is calculated using an OR gate at the first level. C2 is equal to G2+P2·C1, and is calculated using an OR gate at the second level. C3 is equal to G3+P3·G2+P3·P2·C1, and is calculated using an OR gate at the first level to generate G3+P3·G2, and an OR gate at the second level to generate the final result. Finally, C4 is equal to G4+P4·C3, and is calculated using an OR gate at the third level.

Comparing FIG. 3 to FIG. 2 it can be seen that the design of FIG. 3 for generating the first five carry-out terms, C0 to C4, of the carry generator circuit is smaller than for generating the same first five carry-out terms, C0 to C4, of the carry generator circuit of FIG. 2. In particular, although the same number of OR gates are used for both circuits, the circuit of FIG. 3 has no three input OR gates, one less AND gate, and no three input AND gates in comparison to the carry generator circuit of FIG. 2. In addition, the corresponding interconnect lines are also eliminated.

Thus, if a designer were to design a carry generator circuit for eleven adder blocks and is constrained to a maximum fan-in of three, it behooves the designer to generate the first five carry-out terms, C0 to C4, using the circuit of FIG. 3, taking advantage of the third level of gates, rather than implementing the circuit of FIG. 2, which economizes usage of levels. Following the pattern of FIG. 2, the third level of a carry-out generator for eleven adder blocks would not be reached until the ninth carry-out term is calculated, C8, and only carry-out terms C8 to C10 will take advantage of the circuit size reduction that can be achieved by using the third level of logic.

Figure 4:
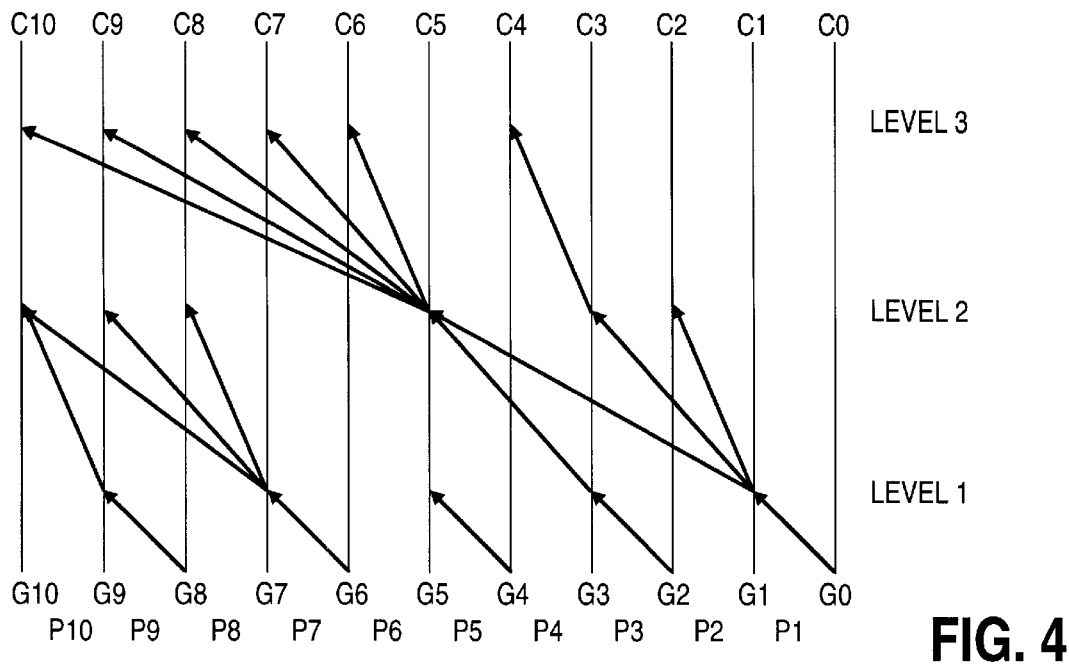
FIG. 4 is a carry-out generator of an adder circuit formed in accordance with another embodiment of the present invention.

FIG. 4 is a three level carry-out generator of an adder circuit comprising eleven adder blocks formed in accordance with one embodiment of the present invention. The carry generator of FIG. 4 builds on the circuit of FIG. 3 to generate the remaining circuitry for calculating the remaining carry-out terms, C5 to C10.

As shown in FIG. 4, C5 is calculated as follows:

$$C5 = [G5 + P5 \cdot G4] + [P5 \cdot P4 \cdot (G3 + P3 \cdot G2)] + [P5 P4 \cdot P3 \cdot P2 \cdot C1]$$

wherein the first term is calculated at the OR gate of Level 1 and the final result is calculated at the three-input OR gate of Level 2. All other OR calculations are generated at other nodes associated with the generation of previous carry-outs.

Note that C5, a carry-out that is subsequent to C4, is finally calculated at a level, Level 2, that is lower than the level at which C4 is finally calculated, Level 3. This reduces the load on the critical signal path line from G4 to C4 by reducing fan-in of the gates on this critical signal path line. This increases the speed at which C5 is calculated at the node of level 2 by increasing the speed at which G4 is provided to the input of the node at level 1 between G5 and C5. This also allows the C4 carry-out term to be generated using a reduced number of logic gates by taking advantage of the third level of gates, without sacrificing utilization of the third level of gates in the calculation of subsequent carry-outs. In addition, the length and routing complexity of the corresponding interconnect lines are reduced. As used herein, the term "finally calculated" means that the output of a logic gate at a particular level is the carry-out term.

As shown in FIG. 4, C6 is calculated as follows:

$$C6 = G6 + P6 \cdot C5$$

wherein the final result is calculated at the OR gate of Level 3. C7 is calculated as follows:

$$C7 = [G7 + P7 \cdot G6] + [P7 \cdot P6 \cdot C5]$$

wherein the first term is calculated at the OR gate of Level 1 and the final result is calculated at the OR gate of Level 3. C8 is calculated as follows:

$$C8 = [G8 + P8 \cdot (G7 + P7 \cdot G6)] + [P8 \cdot P7 \cdot P6 \cdot C5]$$

wherein the first term is calculated at the OR gate of Level 2 and the final result is calculated at the OR gate of Level 3. C9 is calculated as follows:

$$C9 = [G9 + P9 \cdot G8] + [P9 \cdot P8 \cdot (G7 + P7 \cdot G6)] + [P9 \cdot P8 \cdot P7 \cdot P6 \cdot C5]$$

wherein the first term is calculated at the OR gate of Level 1, the first term is ORed with the second term at the OR gate of Level 2, and the final result is calculated at the OR gate of Level 3. C10 is calculated as follows:

$$C10 = [G10 + P10 \cdot (G9 + P9 \cdot G8) + P10 \cdot P9 \cdot P8 \cdot (G7 + P7 \cdot G6)]$$
$$+ [P10 \cdot P9 \cdot P8 \cdot P7 \cdot P6 \cdot C5]$$

wherein the first term is calculated at the three-input OR gate of Level 1 and the final result is calculated at the OR gate of Level 3.

The overall design of the carry generator of FIG. 4 is such that the total number of adder blocks that provide group generates G0–G10 is divided into two approximately equal, consecutive parts, G0 through G5, and G6 through G10. C5 is then finally calculated using consecutive group generate values G0 through G5 in the first part of the circuit at Level 2. A term, the first term in the above equation for C10, is calculated in parallel with the calculation of C5 using consecutive group generate values G6 through G10 in the second part of the circuit, also at Level 2. At the next level, Level 3, C10 is then finally calculated by combining the C5 term from the first part of the circuit with the term from the second part of the circuit using an OR logic gate function. For an alternate embodiment, the number of adder circuits that provide group generate terms is divided into two parts such that the number of group generates combined in a first part is within three group generates of the number of group generates combined in a second part.

Figure 5:
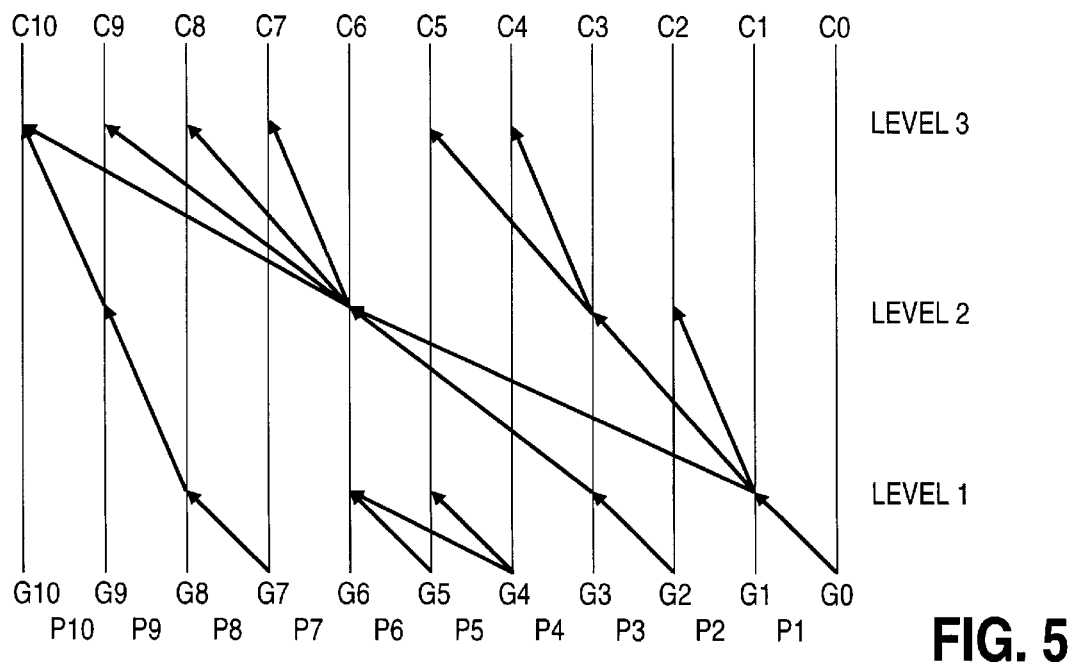
FIG. 5 is a carry-out generator of an adder circuit formed in accordance with another embodiment of the present invention.

FIG. 5 is a three level carry-out generator of an adder circuit comprising eleven adder blocks formed in accordance with another embodiment of the present invention. The carry generator of FIG. 5 also builds on the circuit of FIG. 3 to generate the remaining circuitry for calculating the remaining, subsequent carry-out terms, C5 to C 10.

As shown in FIG. 5, C5 is calculated as follows:

$$C5=[G5+P5\cdot G4]+P5\cdot P4\cdot C3$$

wherein the first term is calculated at the OR gate of Level 1 and the final result is calculated at the OR gate of Level 3. All other OR calculations are generated at other nodes associated with the generation of previous carry-outs. C6 is calculated as follows:

$$C6=[G6+P6\cdot G5+P6\cdot P5\cdot G4]+[P6\cdot P5\cdot P4\cdot(G3+P3\cdot G2)]+$$
$$[P6\cdot P5\cdot P4\cdot P3\cdot P2\cdot(G1+P1\cdot G0)]$$

wherein the first term is calculated at the three-input OR gate of Level 1 and the final result is calculated at the three-input OR gate of Level 2. C7 is calculated as follows:

$$C7=G7+P7\cdot C6$$

wherein C7 is calculated at the OR gate of Level 3. C8 is calculated as follows:

$$C8=[G8+P8\cdot G7]+P8\cdot P7\cdot C6$$

wherein the first term is calculated at the OR gate of Level 1 and the final result, C8, is calculated at the OR gate of Level 3. C9 is calculated as follows:

$$C9=[G9+P9\cdot(G8+P8\cdot G7)]+P9\cdot P8\cdot P7\cdot C6$$

wherein the first term is calculated at the OR gate of Level 2 and the final result is calculated at the OR gate of Level 3. C10 is calculated as follows:

$$C10=[G10+P10\cdot(G9+P9\cdot(G8+P8\cdot G7))]+P10\cdot P9\cdot P8\cdot P7\cdot C6$$

wherein C10 is calculated at the three input OR gate of Level 3.

In accordance with alternate embodiments of the present invention, inverting logic may be used to, for example, improve signal integrity by including inverting buffers, or to better time the logic gates of the logic levels for an embodiment in which the circuit is clocked. In addition, it is to be understood that combining terms using OR gates as discussed above can be accomplished by NOR gates or NAND gates with inverting inputs. Similarly, it is to be understood that the combining terms using AND gates as discussed above can be accomplished by NAND gates or OR gates with inverting inputs. In addition, AND_OR gates can be replaced by OR_AND gates with inverting inputs.

This invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A 64 bit adder circuit to generate carry-outs, the circuit comprising:

eleven adder blocks to receive two numbers to be added and to generate group generate and group propagate terms, each number comprising at least 64 bits a first level of logic comprising logic gates having a maximum fan-in of three;

a second level of logic comprising logic gates having a maximum fan-in of three, the second level being higher than the first level;

a third and highest level of logic comprising logic gates having a maximum fan-in of three;

a first logic gate at the second level of logic, the first logic gate to finally calculate a first carry-out; and a second logic gate at the first level of logic, the second logic gate to finally calculate a second carry-out, the second carry-out being subsequent to the first carry-out.

2. The circuit of claim 1, further comprising a third logic gate at the second level of logic, the third logic gate to finally calculate a third carry-out, the third carry-out being subsequent to the second carry-out.

3. The circuit of claim 1, wherein the first level and the second level comprise up to one OR gate per corresponding carry-out per level.

\* \* \* \* \*

UNITED STATES PATENT AND TRADEMARK OFFICE
CERTIFICATE OF CORRECTION

PATENT NO.   : 5,944,777
DATED        : August 31, 1999
INVENTOR(S)  : Kumar et al.

It is certified that error appears in the above-identified patent and that said Letters Patent is hereby corrected as shown below:

Column 5,
Line 46, delete "art".

Signed and Sealed this

Twenty-ninth Day of April, 2003

JAMES E. ROGAN
Director of the United States Patent and Trademark Office